US007677718B2

(12) United States Patent
Bailey et al.

(10) Patent No.: US 7,677,718 B2
(45) Date of Patent: Mar. 16, 2010

(54) FLEXIBLE MEMBER HAVING TENSIONING MEMBERS

(75) Inventors: John Kennedy Bailey, San Diego, CA (US); Gerhard Koon, San Diego, CA (US); William H Schwiebert, Poway, CA (US); Petrica Balcan, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1112 days.

(21) Appl. No.: 11/016,675

(22) Filed: Dec. 17, 2004

(65) Prior Publication Data

US 2006/0132536 A1 Jun. 22, 2006

(51) Int. Cl.
*B41J 2/01* (2006.01)
*B41J 23/00* (2006.01)
*G03G 15/00* (2006.01)
*F16H 7/14* (2006.01)

(52) U.S. Cl. ......................... 347/104; 347/37; 399/162; 474/117

(58) Field of Classification Search ................. 347/104, 347/37; 474/117; 399/162
See application file for complete search history.

(56) References Cited

U.S. PATENT DOCUMENTS 4,264,912 A * 4/1981 Coburn et al. ............... 347/121
4,607,354 A * 8/1986 Ishibashi et al. ......... 369/30.85
4,672,390 A * 6/1987 Ishikawa ...................... 347/74
4,826,470 A * 5/1989 Breon et al. ................ 474/110
5,456,539 A * 10/1995 Wright et al. ................. 400/82
5,465,107 A * 11/1995 Mayo et al. ............. 346/139 R
5,779,376 A * 7/1998 Seu ............................ 400/335
5,832,353 A * 11/1998 Sano .......................... 399/329
5,964,542 A * 10/1999 Ruhe et al. .................. 400/352
6,004,050 A * 12/1999 Rehman et al. ............. 400/319
6,045,212 A * 4/2000 Ruhe et al. ..................... 347/37
6,123,472 A 9/2000 Elgee
6,478,403 B1 * 11/2002 Giles et al. ..................... 347/37
6,508,534 B1 1/2003 Yusef et al.
6,598,956 B2 7/2003 Yusef et al.
7,101,036 B2 * 9/2006 Nakashima et al. .......... 347/104
2002/0118982 A1 * 8/2002 Fuma .......................... 399/329
2002/0127040 A1 * 9/2002 Davies et al. ................. 400/76
2002/0130923 A1 * 9/2002 Sato ............................ 347/37
2002/0140756 A1 * 10/2002 Kuriyama et al. ............. 347/19
2003/0147676 A1 * 8/2003 Sakata et al. ................ 399/286
2003/0221656 A1 * 12/2003 Kitamura et al. ........ 123/198 R
2004/0081502 A1 4/2004 Williams
2005/0096165 A1 * 5/2005 Lin ............................ 474/101

* cited by examiner

*Primary Examiner*—Stephen D Meier
*Assistant Examiner*—Sarah Al-Hashimi

(57) ABSTRACT

Several embodiments of apparatus and methods are disclosed. One or more of the disclosed example devices includes a flexible member having first and second tensioning members.

23 Claims, 2 Drawing Sheets

FLEXIBLE MEMBER HAVING TENSIONING MEMBERS

BACKGROUND

Tensioned belts are sometimes employed to transfer rotational power from a rotating shaft to another object, such as an item coupled to the belt or to a pulley. Having a high belt tension may be problematic in that the high belt tension may lead to motor heating and rapid wear of motor bushings for the motor driving the rotating shaft. Having a low belt tension may also be problematic in that slipping may occur between the belt and the shaft or pulley.

DETAILED DESCRIPTION

Figure 1:
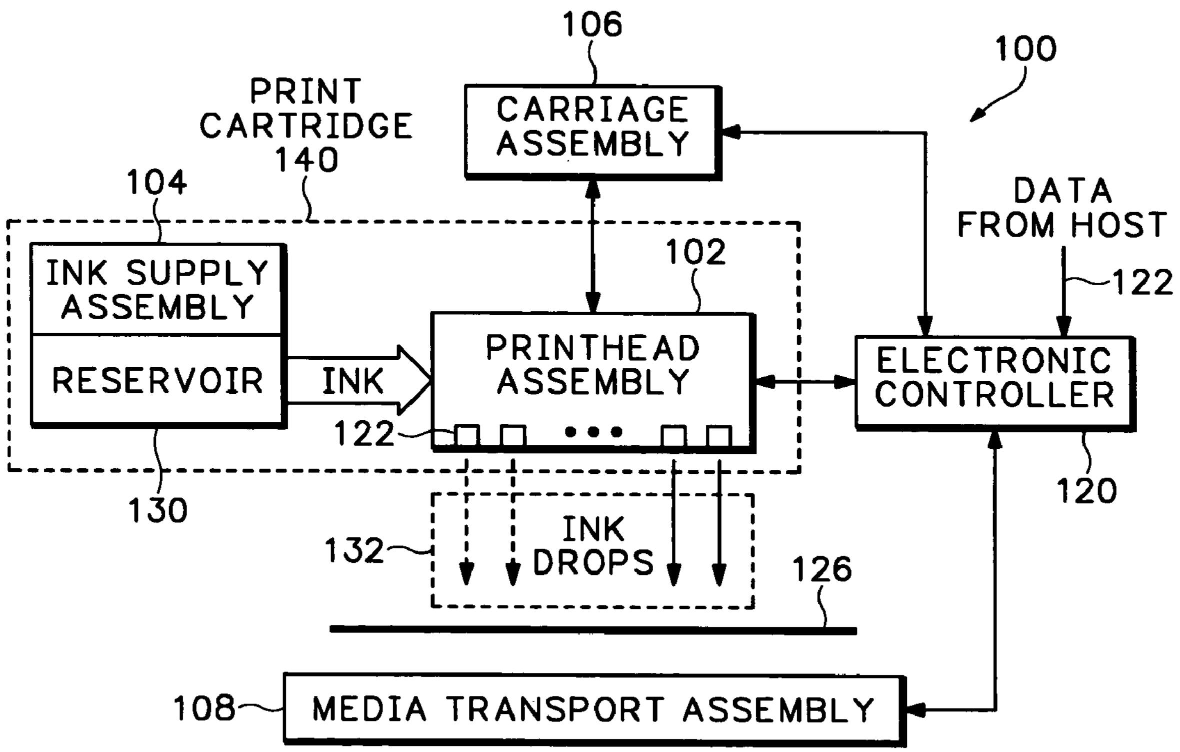
FIG. 1 schematically illustrates an inkjet printing system in accordance with an example embodiment.

FIG. 1 illustrates an example embodiment of a portion of an inkjet printing system 100. Inkjet printing system 100 includes an inkjet printhead assembly 102, an ink supply assembly 104, a carriage assembly 106, a media transport assembly 108, and an electronic controller 120. Inkjet printhead assembly 102 includes a printhead that ejects drops of ink through a plurality of orifices or nozzles 122 toward a print medium 126 so as to print onto print medium 126. Print medium 126 may comprise any type of suitable media, such as, but not limited to, paper, cardstock, transparencies, and the like. In some embodiments, nozzles 122 are arranged in one or more columns or arrays such that properly sequenced ejection of ink from nozzles 122 causes characters, symbols, and/or other graphics or images to be printed upon print medium 126 as inkjet printhead assembly 102 and print medium 126 are moved relative to each other.

Ink supply assembly 104 supplies ink to printhead assembly 102 and includes a reservoir 130 for storing ink. As such, ink flows from reservoir 130 to inkjet printhead assembly 102. In some embodiments, inkjet printhead assembly 102 and ink supply assembly 104 are housed together in an inkjet print cartridge or pen as defined by dashed line 140. In other embodiments, ink supply assembly 104 and/or reservoir 130 are separate from ink printhead assembly 102 and supply ink to inkjet printhead assembly 102 from an off-axis position. In some embodiments, the reservoir 130 of ink supply assembly 104 may be removed, replaced, and/or refilled.

Carriage assembly 106 positions inkjet printhead assembly 102 relative to media transport assembly 108, and media transport assembly 108 positions print medium 126 relative to the inkjet printhead assembly 102. Thus, a print zone 132 is defined adjacent to nozzles 122 in an area between inkjet printhead assembly 102 and print medium 126. In a scanning-type printing system, carriage assembly 106 moves inkjet printhead assembly 102 relative to media transport assembly 108 to scan print medium 126. As such, carriage assembly 106 includes a carriage and a carriage drive assembly, as described below. Thus, in some embodiments, the entire print cartridge 140 is positioned in and supported by the carriage and the carriage drive assembly moves print cartridge 140, including inkjet printhead assembly 102, back and forth across print medium 126. In other embodiments, the printhead assembly 102 is positioned in and supported by the carriage while the ink supply assembly 104 and reservoir 130 are not carried by the carriage.

Electronic controller 120 communicates with the inkjet printhead assembly 102, carriage assembly 106, and media transport assembly 108. Electronic controller 120 receives data 122 from a host system, such as a computer, and may include a memory for temporarily storing data 122. Data 122 represents, for example, a document and/or file to be printed. As such, data 122 forms a print job for inkjet printing system 100 and may include one or more print job commands and/or command parameters.

Electronic controller 122 provides control of inkjet printhead assembly 102 including timing control for ejection of ink drops from nozzles 122. Electronic controller 122 also provides control of carriage assembly 106 including timing and a direction of movement relative to print medium 126. As such, electronic controller 120 defines a pattern of ejected ink drops which form characters, symbols, and/or other graphics or images on print medium 126.

Figure 2:
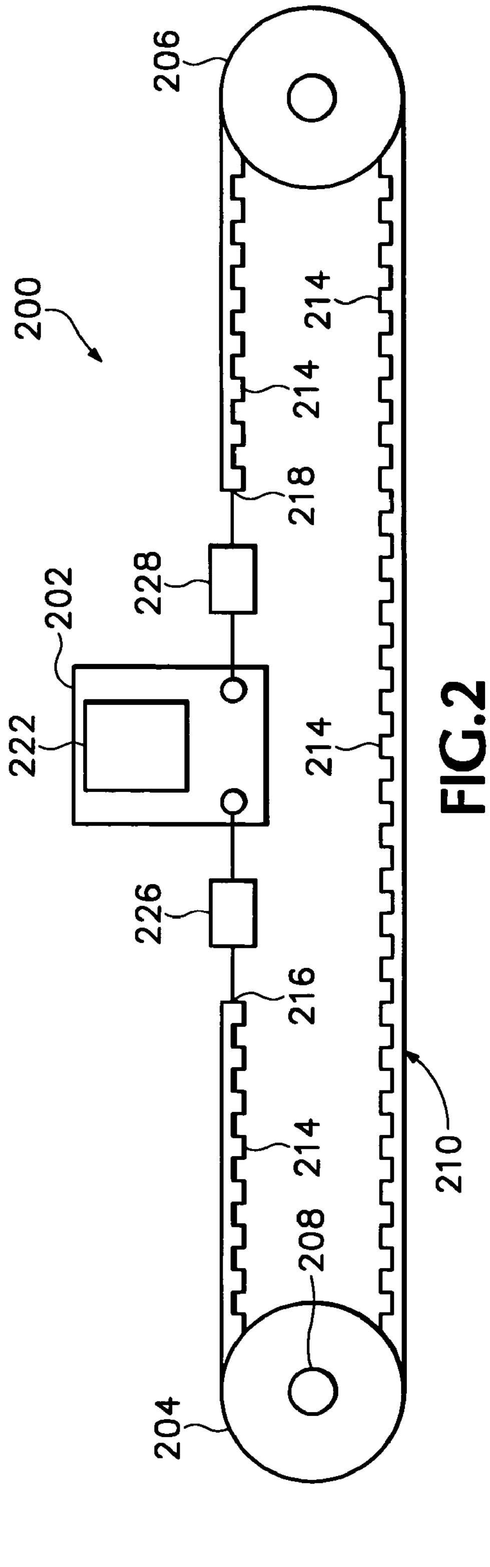
FIG. 2 is a side view of a portion of a carriage drive assembly, in accordance with an example embodiment.

FIG. 2 illustrates a portion of an example carriage assembly 200 that may be used in an imaging device, such as the inkjet printing system 100. As shown, the carriage assembly 200 includes a carriage 202, a drive pulley 204, an idler pulley 206, and a belt 210 disposed about the pulleys 204, 206. The drive pulley 204 and the idler pulley 206 are shown in this embodiment as being spaced from each other by a fixed distance and generally disposed in the same plane. The drive pulley 204 is coupled to a motor (not shown) by shaft 208 in a manner than permits the motor to transfer rotational power to the drive pulley 204 via the shaft 208. The motor thus drives the drive pulley 204 in different directions in response to control signals received from a suitable controller, such as the electronic controller 120 (FIG. 1).

The belt 210 comprises an elongated flexible member and, in some embodiments, comprises a timing belt. In the embodiment shown in FIG. 2, the belt 210 includes teeth 214 formed therein and sized to engage grooves (not shown) formed on the periphery of the pulleys 204, 206. In alternative embodiments, the belt 210 may comprise a flat belt disposed about pulleys without grooves formed therein. The belt 210, in alternate embodiments, may comprise an endless belt.

The belt 210 may be formed any of a variety of suitable materials, including, for example, a nylon fabric. In some embodiments, the belt 210 does not significantly stretch axially under loads common to the assembly 200.

FIG. 2 also illustrates the belt 210 being split and having ends 216, 218. The carriage 202 is elastically or resiliently coupled to the belt 210 via tensioning members 226, 228. The tensioning members 226, 228 may comprise springs or other suitable elastic tensioning members. In some embodiments, the tensioning members 226, 228 may comprise, for example, leaf springs, coil springs, wave springs, or the like and serve to tension the belt 210.

The carriage 202 serves as a base for carriage assembly 106 and is shown as being adapted to carry and support a printhead assembly 222 therein. The printhead assembly 222 may be configured and may operate in a manner similar to the printhead assembly 102 described above.

The tensioning members 226, 228 serve to tension the belt 210 and to filter vibrations from the belt 210, according to some embodiments. Pursuant to some embodiments, vibrations, such as those that may originate at the motor may be transferred to the belt 210 via the shaft 208 and the pulley 204. The tensioning members 226, 228, in some of these embodiments may serve to at least partially reduce, or dampen, these vibrations such that these vibrations have less effect on the carriage 202 and printhead assembly 222.

In the configuration shown in FIG. 2, the tensioning members 226, 228 act substantially independently and provide for similar belt tensions regardless of the direction of motion of the belt 210. Since the tension of the belt 210 is not significantly dependent upon the direction of motion of the belt, low belt tensions can be employed. These low belt tensions may also permit usage of a smaller motor to drive the pulley 204.

The tensioning members 226, 228 may be coupled to the carriage 202 by any of a variety of suitable ways. For example, in some embodiments the tensioning members 226, 228 may be coupled to the carriage 202 by coupling an end of each of the tensioning members 226, 228 to the carriage 202 by a suitable respective fastener (not shown). Clips, adhesives, or other coupling members or materials may alternatively be used to couple the tensioning members 226, 228 to the carriage 202.

Similarly, the tensioning members 226, 228 may be coupled to the belt 210 by any of a variety of suitable ways. The tensioning members 226, 228 may be coupled to the belt 210 at or adjacent the ends 216, 218. In some embodiments, the tensioning members 226, 228 are coupled to the ends 216, 218 of the belt 210. Further, as shown in FIG. 2, the carriage 202 is substantially centered between the tensioning members 226, 228.

In an example inkjet printing implementation, the carriage 202 may have a mass in the range of about 20 grams to 1 kilogram and may nominally have a mass of about 90 grams. Moreover, in this example embodiment, the tensioning members 226, 228 may have a spring constant rate of about 0.75 Newton/mm. The spring constant rate may be in the range of about 0.1 to 7.5 Newton/mm in other inkjet printing embodiments. Further, the belt 210 may have a tension of about 2.5 Newtons. In other inkjet printing embodiments, the belt 210 may have a tension in the range of about 1 to 25 Newtons. Linear acceleration of the carriage 202 may be about 1.2 g in this example embodiment. In other inkjet printing embodiments, the linear acceleration of the carriage may be in the range of about 0.5 to 5.0 g. It should be understood that embodiments of the present subject matter may be outside these example ranges. These ranges are provided by way of example and are non-limiting. Further, embodiments of the present subject matter may be used in applications other than inkjet printing.

Figure 3:
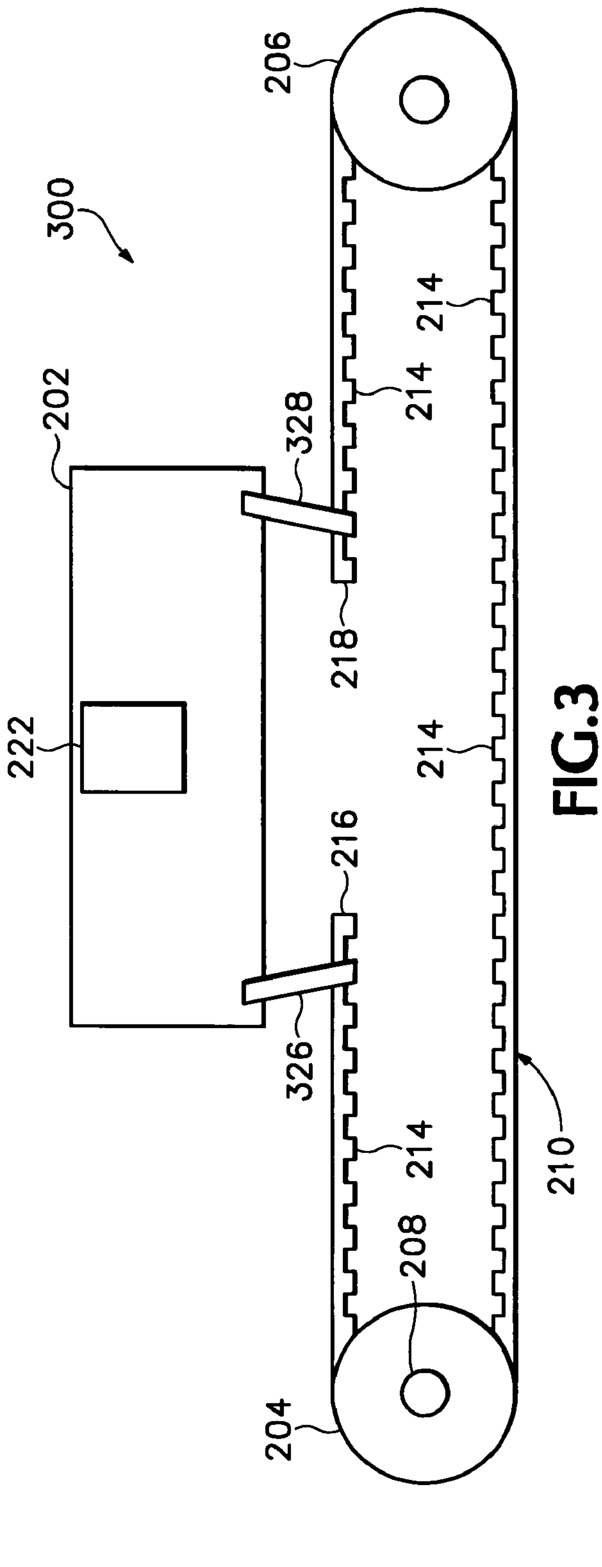
FIG. 3 is a side view of a portion of a carriage drive assembly in accordance with another example embodiment.

FIG. 3 illustrates a portion of an example carriage assembly 300 that may be used in an imaging device, such as the inkjet printing system 100. The carriage assembly 300 is configured the same as the carriage assembly 200 described above, except as follows. The carriage 202 is coupled to the belt 210 via leaf springs 326, 328. The leaf springs 326, 328 may be formed of sheet metal or other suitable material and serve to tension the belt 210.

Although the present disclosure has been described with reference to example embodiments, workers skilled in the art will recognize that changes may be made in form and detail without departing from the spirit and scope thereof. For example, although different example embodiments may have been described as including one or more features providing one or more benefits, it is contemplated that the described features may be interchanged with one another or alternatively be combined with one another in the described example embodiments or in other alternative embodiments. The present subject matter described with reference to the example embodiments and set forth in the following claims is manifestly intended to be broad. For example, unless specifically otherwise noted, the claims reciting a single particular element also encompass a plurality of such particular elements.

What is claimed is:

1. A device, comprising:

a belt;

a carriage;

a first tensioning member disposed between the carriage and the belt;

a second tensioning member disposed between the carriage and the belt;

the first and second tensioning members configured to tension the belt, wherein the first and second tensioning members comprise springs, each of the first and second springs having a first end coupled to the carriage and a second end coupled to the belt, wherein the first and second tensioning members are configured to filter out vibration frequencies in the belt during operation;

a first pulley;

a second pulley spaced a fixed distance from the first pulley, wherein the belt is disposed around the first and second pulleys and wherein the carriage is coupled to the belt via the tensioning members such that the tensioning members tension the belt about the first and second pulleys; and an inkjet printhead at the carriage, wherein the carriage has a mass in the range of 20 grams to 1000 grams, wherein the belt has a tension in the range of 1 to 25 Newton and wherein the first tensioning member and the second tensioning member each have a spring rate in the range of 0.1 to 7.5 Newton/mm.

2. The device of claim 1, wherein the belt comprises a timing belt.

3. The device of claim 1, wherein the first and second tensioning members comprise leaf springs.

4. The device of claim 1, wherein the first and second tensioning members comprise coiled springs.

5. The device of claim 1, wherein an end of the first tensioning member is directly connected to the carriage.

6. The device of claim 1, wherein the first and second tensioning members are directly connected to the carriage.

7. The device of claim 1, wherein the carriage is configured to hold at least one printhead.

8. The device of claim 1, wherein the carriage is configured to hold at least one print cartridge.

9. The device, of claim 1, wherein the first and second tensioning members are positioned between the first and second pulleys.

10. The device of claim 1 further comprising at least one printhead at the carriage.

11. The device of claim 1, wherein the belt has a first end and a second end, the first end of the belt attached to the first tensioning member and the second end of the belt attached to the second tensioning member.

12. The device of claim 1, wherein the belt comprises teeth.

13. The device of claim 1, wherein at least one of the first tensioning member and the second tensioning member comprises an elastic member.

14. The device of claim 1, wherein the carriage is substantially centered between the tensioning members.

15. The apparatus of claim 1, wherein the belt comprises teeth.

16. The device of claim 1, wherein the belt is discontinuous.

17. A device, comprising:

a belt;

a carriage;

a first tensioning member disposed between the carriage and the belt;

a second tensioning member disposed between the carriage and the belt; the first and second tensioning members configured to tension the belt, wherein an end of the first tensioning member is directly connected to the carriage, wherein the carriage has a mass in the range of 20 grams to 1000 grams, wherein the first and second tensioning members are configured to filter out vibration frequencies in the belt during operation and wherein the belt has a tension in the range of 1 to 25 Newton and wherein the first tensioning member and the second tensioning member each have a spring rate in the range of 0.1 to 7.5 Newton/mm.

18. The device of claim 17, wherein the carriage is configured to hold at least one printhead.

19. The device of claim 17, wherein the carriage is configured to hold at least one print cartridge.

20. The device, of claim 17, further comprising:

first and second pulleys;

the belt disposed around the first and second pulleys, the first and second tensioning members positioned between the first and second pulleys.

21. The device of claim 17, wherein the belt has a first end and a second end, the first end of the belt attached to the first tensioning member and the second end of the belt attached to the second tensioning member.

22. The device of claim 17 further comprising:

a first pulley;

a second pulley spaced a fixed distance from the first pulley, wherein the belt is disposed around the first and second pulleys and wherein the carriage is coupled to the belt via the tensioning members such that the tensioning members tension the belt about the first and second pulleys.

23. The device of claim 17, wherein the belt is discontinuous.

* * * * *

UNITED STATES PATENT AND TRADEMARK OFFICE

CERTIFICATE OF CORRECTION

PATENT NO. : 7,677,718 B2
APPLICATION NO. : 11/016675
DATED : March 16, 2010
INVENTOR(S) : John Kennedy Bailey et al.

It is certified that error appears in the above-identified patent and that said Letters Patent is hereby corrected as shown below:

In column 4, line 48, in Claim 9, delete “device,” and insert -- device --, therefor.

In column 6, line 1, in Claim 20, delete “device,” and insert -- device --, therefor.

Signed and Sealed this

Twenty-seventh Day of July, 2010

David J. Kappos

*Director of the United States Patent and Trademark Office*